(No Model.) 7 Sheets—Sheet 4.
P. V. W. WELSH.
COIN OPERATED PHOTOGRAPH MACHINE.

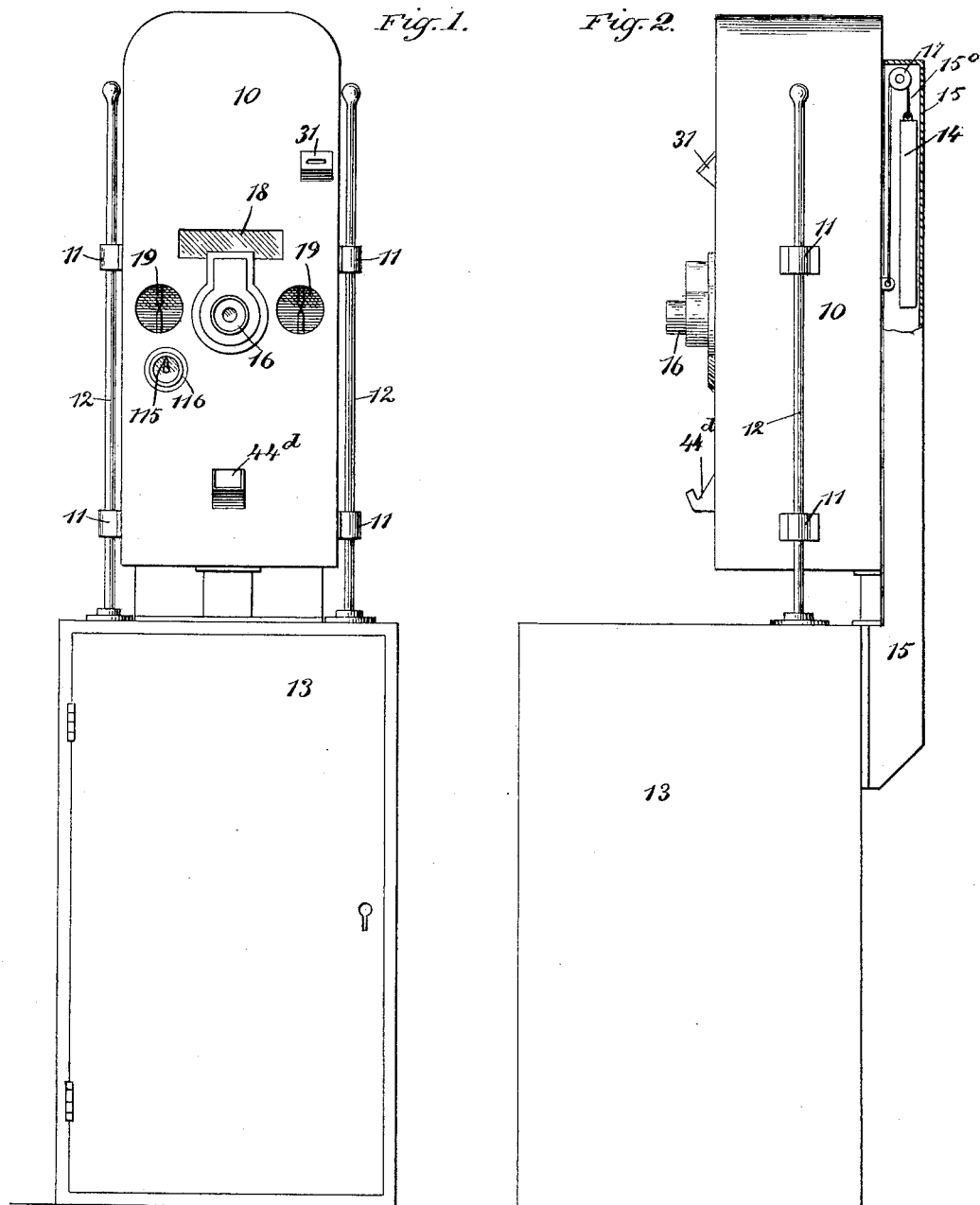

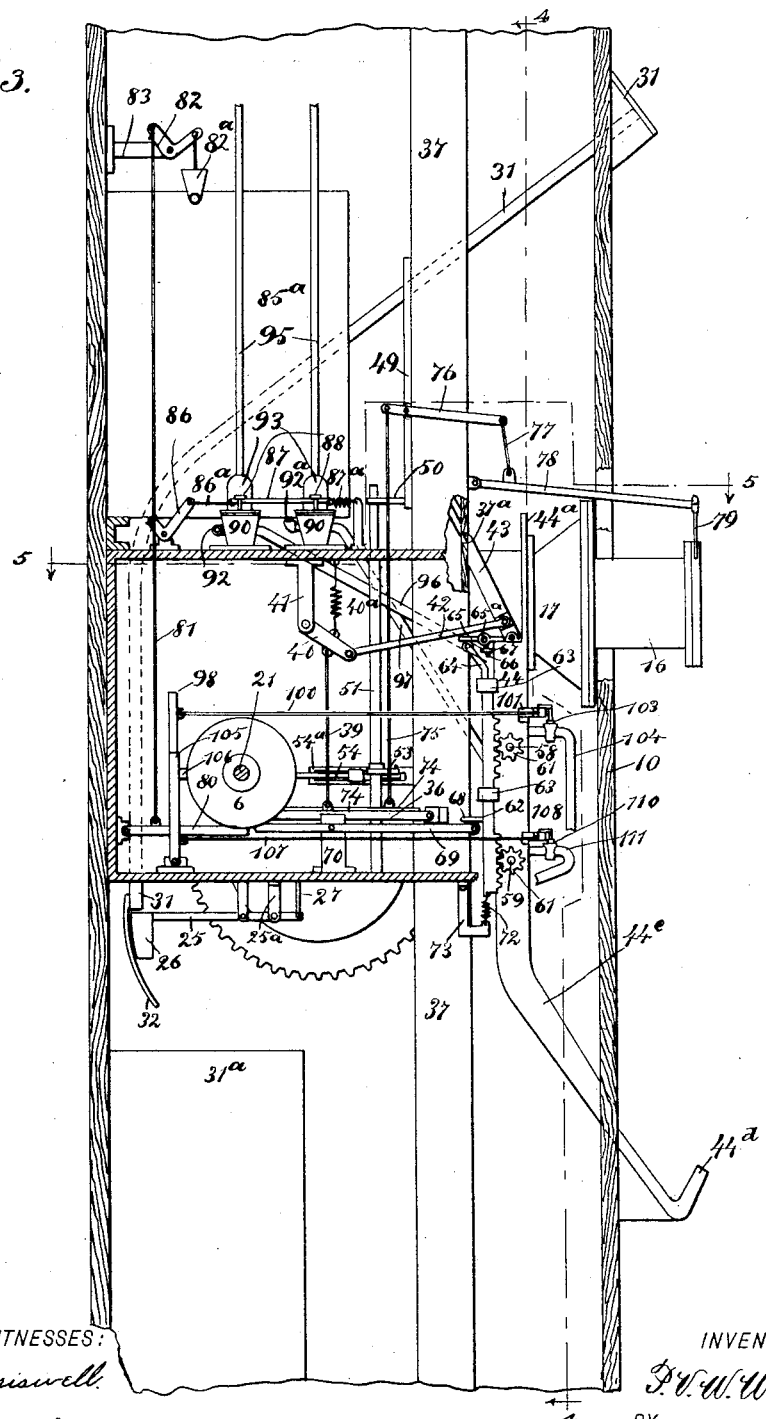

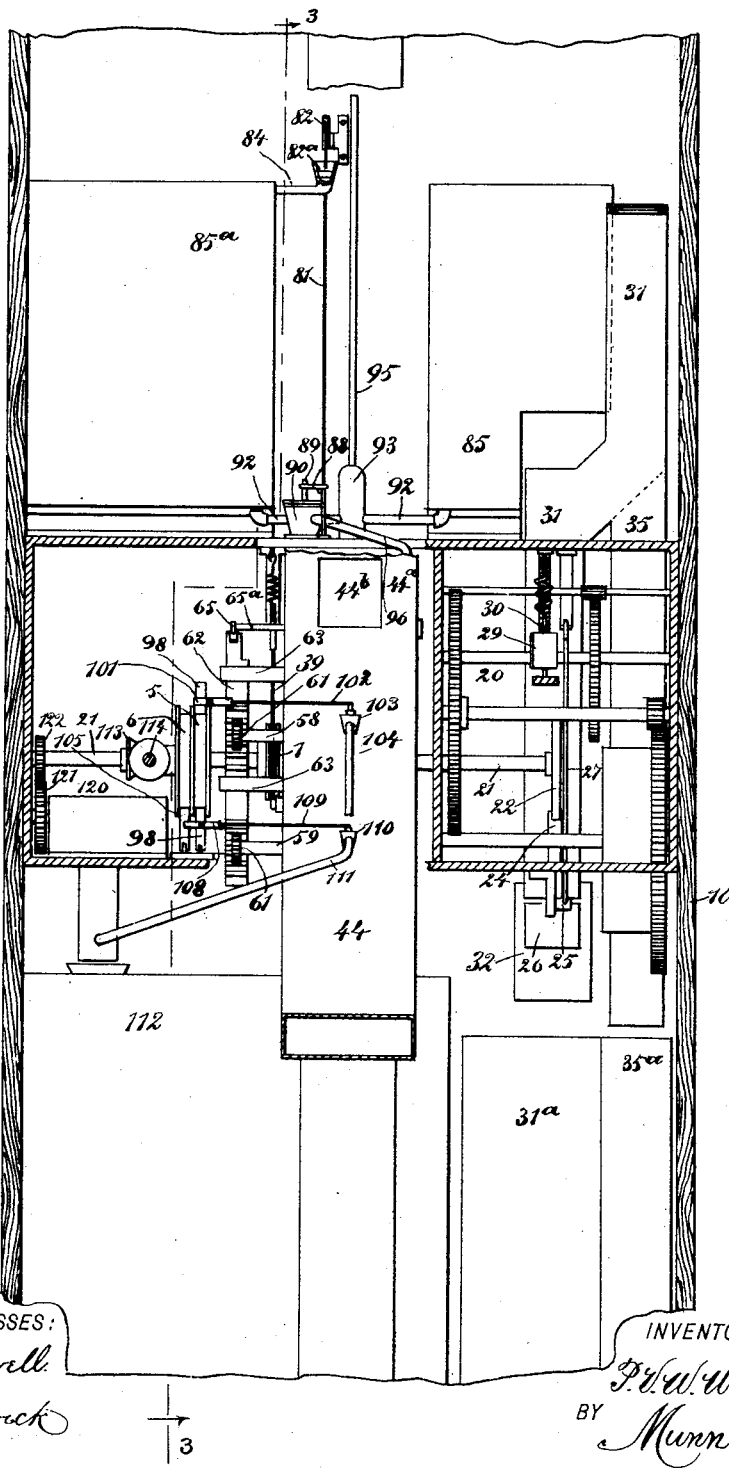

No. 465,740. Patented Dec. 22, 1891.

WITNESSES:
J. E. Criswell
C. Sedgwick

INVENTOR:
P. V. W. Welsh
BY Munn & Co.
ATTORNEYS (No Model.) 7 Sheets—Sheet 5.
P. V. W. WELSH.
COIN OPERATED PHOTOGRAPH MACHINE.
No. 465,740. Patented Dec. 22, 1891.
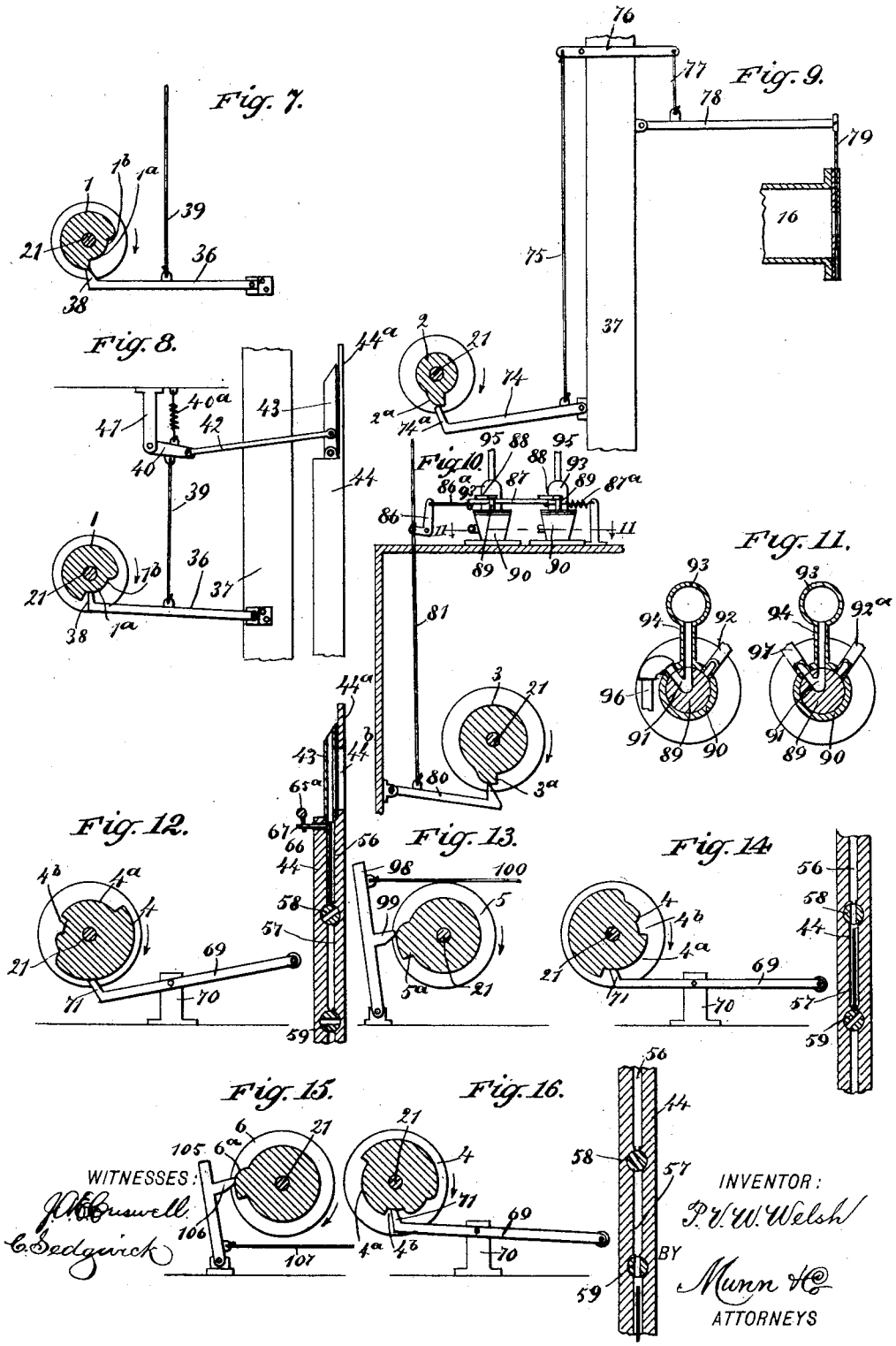

(No Model.) 7 Sheets—Sheet 6.
P. V. W. WELSH.
COIN OPERATED PHOTOGRAPH MACHINE.
No. 465,740. Patented Dec. 22, 1891.
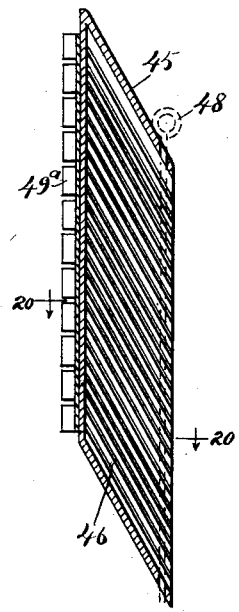
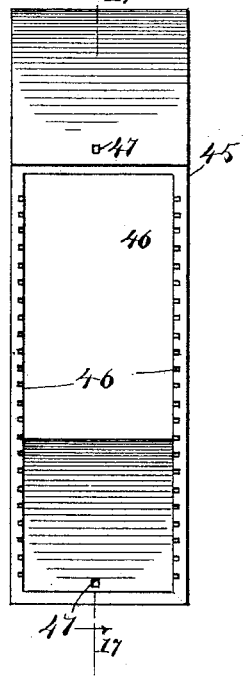
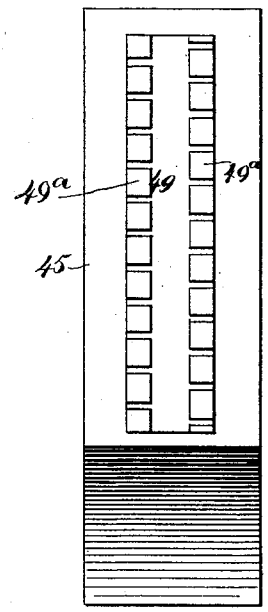
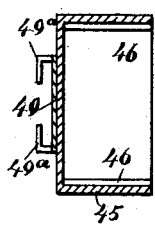
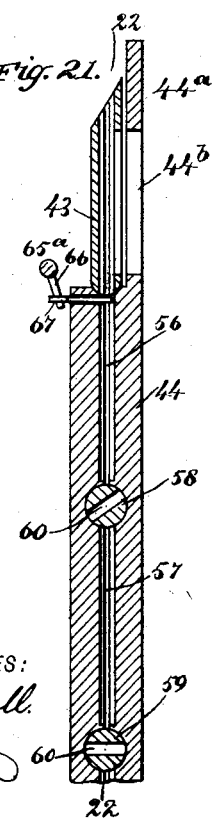
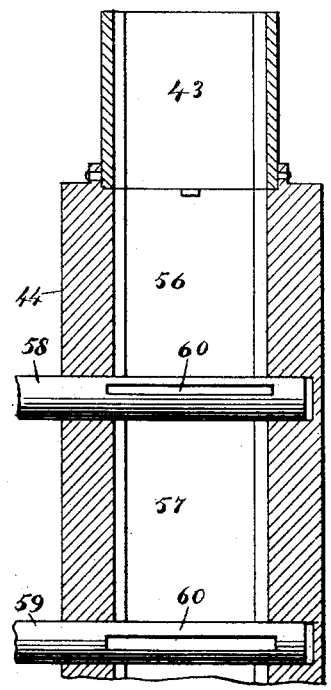
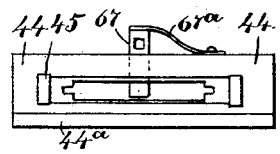
WITNESSES:
INVENTOR:
P. V. W. Welsh
BY
Munn & Co.
ATTORNEYS (No Model.) 7 Sheets—Sheet 7.
P. V. W. WELSH.
COIN OPERATED PHOTOGRAPH MACHINE.
No. 465,740. Patented Dec. 22, 1891.
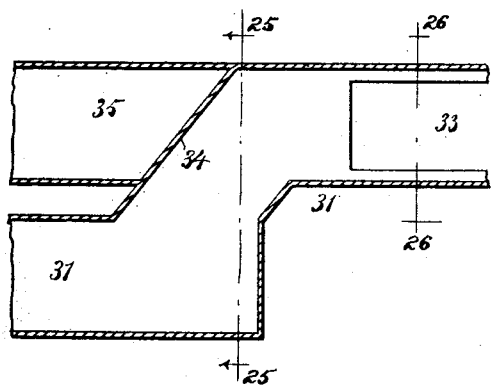
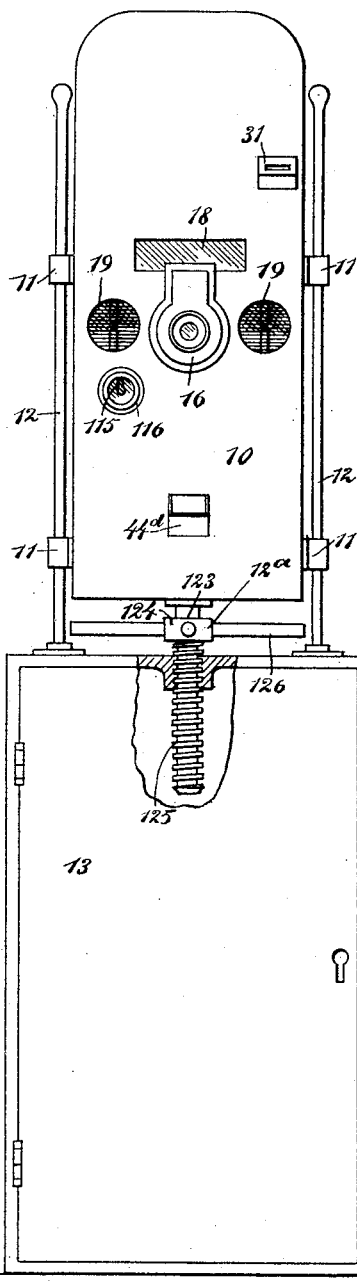
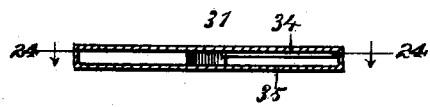
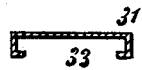
WITNESSES:
INVENTOR:
ATTORNEYS

United States Patent Office.

PIERRE V. W. WELSH, OF NEW YORK, N. Y., ASSIGNOR OF ONE-HALF TO WILLIAM F. FREEMAN, OF SAME PLACE.

COIN-OPERATED PHOTOGRAPH-MACHINE.

SPECIFICATION forming part of Letters Patent No. 465,740, dated December 22, 1891.

Application filed March 9, 1891. Serial No. 384,281. (No model.)

*To all whom it may concern:*

Be it known that I, PIERRE V. W. WELSH, of New York city, in the county and State of New York, have invented a new and Improved Coin-Operated Photograph-Machine, of which the following is a full, clear, and exact description.

My invention relates to improvements in coin-operated machines for taking photographs, and especially to that variety of machines which are used for producing tintypes; and the object of my invention is to produce a machine which upon the insertion in the slot of the machine of a coin representing the price of a picture will quickly produce a good picture and deliver it to the purchaser.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 5:
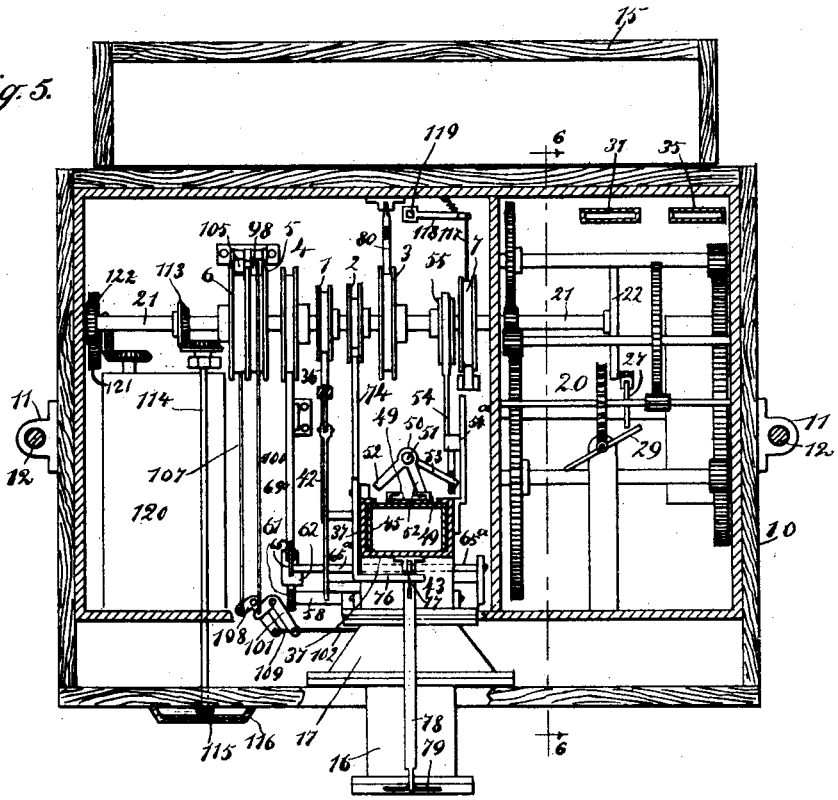
Figure 6:
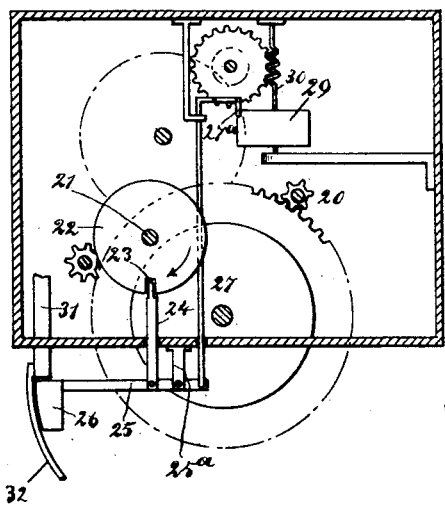

Figure 1 is a front elevation of a machine embodying my invention. Fig. 2 is a broken side elevation of the same. Fig. 3 is a broken enlarged vertical section on the line 3 3 in Fig. 4. Fig. 4 is a broken vertical section on the line 4 4 in Fig. 3, showing the main portion of the mechanism in front elevation. Fig. 5 is a sectional plan view of the machine on the line 5 5 in Fig. 3. Fig. 6 is a detail vertical section of the clock-work mechanism on the line 6 6 in Fig. 5. Fig. 7 is a detail view of the cam and lever which operate the plate-holder, showing the same in their first or normal position. Fig. 8 is a detail sectional view of the cam-operated mechanism which operates the plate-holder, showing the cam in its second position and the holder in position to deliver a plate into the developing-bath. Fig. 9 is a detail view of the cam-operated mechanism for working the lens-shutter. Fig. 10 is a detail view of the valves and bulbs which deliver and measure the developing and fixing liquids and the cam-operated mechanism for operating the valves. Fig. 11 is an enlarged cross-section of the valves and bulbs on the line 11 11 in Fig. 10. Fig. 12 is a detail view of the cam and lever for operating the bath-valve rack, showing the cam in its normal position. Fig. 13 is a detail view of the cam and lever mechanism for operating the valves which release the developing-liquid after it has been used. Fig. 14 is a detail view of the cam and lever which operate the rack that connects with the plugs or valves in the bath-tank, showing the position of the lever after it has turned the upper plug or valve to allow a plate to slide through. Fig. 15 is a detail view of the cam and lever mechanism for operating the valve which releases the fixing-liquid. Fig. 16 is a detail view of the cam and lever for operating the plugs or valves in the bath-tank, showing the relative position of the cam and lever after the plate has been fixed and dropped through the second plug. Fig. 17 is an enlarged vertical section of the plate-carrier on the line 17 17 in Fig. 18. Fig. 18 is a detail front elevation of the plate-carrier. Fig. 19 is a detail rear elevation of the same. Fig. 20 is a cross-section through the carrier on the line 20 20 in Fig. 17. Fig. 21 is an enlarged broken vertical section of the bath-tank, showing the developing and fixing chambers and the plate-holder, which is pivoted on the tank. Fig. 22 is a vertical section of the same on the line 22 22 in Fig. 21. Fig. 23 is a detail plan view of the same. Fig. 24 is a broken longitudinal section of the coin-chute on the line 24 24 in Fig. 25. Fig. 25 is a cross-section of the chute on the line 25 25 in Fig. 24. Fig. 26 is a cross-section of the chute on the line 26 26 in Fig. 24; and Fig. 27 is a front elevation of the machine, showing a modified means of raising and lowering the case which carries the photographing mechanism.

The machine is provided with a case 10, which carries the mechanism for photographing. The case is provided on the sides with keepers 11, which slide vertically on the posts 12, and the posts are supported on a case 13, which is adapted to carry mechanism for producing an electric light; but I have not shown the light mechanism in detail, as it is my intention to apply for a separate patent for the same. The case 10 is thus capable of a vertical movement on the posts 12, and the case is counterbalanced by a weight 14, which moves vertically in a box 15, which is secured to the case 13 and extends upward behind the case 10, the weight being connected with the case 10 by means of a cord 15ª, which extends over a suitable guide-pulley 17 in the upper part of the box. The object of having the case 10 movable is so as to bring the focus into a desired position and adjust it for people of different heights.

The lens 16, which is of the usual form, is located near the middle of the case 10 and in the front side of the same, and immediately above the lens is a mirror 18, the object of which is to indicate when the case 10 is at the right height, as when the person whose picture is to be taken can see his face in the mirror the lens will be in the right position to take the picture. On each side of the lens is an electric light 19, which is preferably covered with colored glass, so that the glare will not affect the eyes of the person posing, and the lights enable the machine to be used in the night as well as in the day time.

Within the case 10 is a clock-work movement 20, any desired clock mechanism being used, and this clock mechanism drives a main shaft 21, which extends transversely through the case and which carries the necessary cams, gears, &c., for operating the various parts of the machine. The main movements of the different parts are produced by the cams 1, 2, 3, 4, 5, and 6, carried by the shaft, and the cams operate in the manner described below.

The shaft 21 makes one revolution every time a coin is dropped in the machine, and this revolution actuates all the different parts to produce a picture, and the following mechanism is employed for tripping the shaft at each revolution: On one end of the shaft 21 is a disk 22, which has a notch 23 in one side, and the notch is engaged by a post 24, which extends downward through a case enveloping the clock-movement, and the lower end of the post is pivoted to a lever 25, which lever is pivoted in lugs 25ª on the under side of the clock-movement case. The lever 25 is provided with a coin-plate 26 at one end, which plate is made in the form of a weight, which serves as a counter-balance for the rod 27, which rod is pivoted to the rear end of the coin-lever and extends upward through the clock-movement case, its upper end being bent twice at a right angle, so that the extreme point 27ª will extend into the path of a fan 29, which is carried by the worm-shaft 30 of the clock mechanism, and the resistance of the fan serves as a regulator for the clock-spring and prevents the movement from going too fast. It will thus be seen that when a coin is dropped on the plate 26 it lowers one end of the lever 25, thus releasing the post 24 from the disk 22, so that the main shaft may turn, and it also raises the rear end of the lever, so as to raise the rod 27 from the path of the fan 29 and the mechanism is free to work. The plate 26 is arranged beneath the lower end of the coin-chute 31, and the coin-chute is provided at its lower end with a curved guide 32, which is placed opposite the outer portion of the plate 26 and serves to prevent the coin from slipping from the plate too quickly, and also serves as a guide for the plate.

The coin-chute opens from the front of the case 10, as shown in Fig. 1, and extends downward to deliver upon the coin-plate, and to provide against the mechanism being operated by two small a coin or by any useless metal the chute is constructed as follows: The chute is arranged so that the coins will slide therein instead of rolling, and on the under side of the coin-chute is a slot 33, which is nearly as wide as the chute, so that if a coin which is too small is placed in the chute it will drop through the slot without operating the mechanism. Immediately below the slot 33 the chute is bent laterally and is provided with a diagonal partition 34, extending across the upper portion of the chute, and opening from beneath this partition is a branch chute 35, which delivers into a box 35ª, and if a coin which is too thin is placed in the chute it will pass beneath the partition 34 without operating the mechanism; but if a coin of the right size is delivered in the chute it will be deflected by the partition 34 into the main portion of the chute, and will be delivered upon the coin-plate 26, and from thence into a coin-box 31ª.

The cam 1 on the main shaft is adapted to operate the picture-plate holder and is provided with an indentation 1ª on one side, and this indentation is notched, as shown at 1ᵇ. A lever 36 is pivoted at one end to a lug which extends from the side of the carrier-chute 37, and the opposite end of the lever is bent upward, as shown at 38, so that it will press against the face of the cam, and the lever is also connected by a rod 39 with a link 40, which is pivoted vertically above it, and the link, the rod, and the lever are normally held upward by a spring 40ª, which is secured to a suitable support within the main case 10. One end of the link 40 is pivoted to a lug 41, which extends downward from the partition in the main case, and the opposite end of the link is pivoted to one end of a connecting-rod 42, the other end of the connecting-rod being pivoted to the plate-holder 43, which plate-holder is open in front, is hollow, so that a picture-plate can easily slide into and through it, is beveled at its upper end, so that it may close closely against the carrier-chute, and is pivoted on the top of the bath-tank 44, so as to swing upward against a projecting plate 44ª on the upper end of the bath-tank. The plate-holder, when swung upward into this position, will allow a plate to drop through into the tank beneath, and when it is thrown back against the carrier-chute it will be adapted to receive a plate from the carrier.

It will be seen that when the lever 36 is in its normal position, as shown in Fig. 7, the lever will be depressed and the link 40 and inner end of the rod 42 pulled downward, so that the plate-holder will be swung against the carrier-chute, as shown in Fig. 3, ready to receive a picture-plate, and when the lever 36 is pulled up into the indentation in the cam 1 the spring 40ª will raise the link 40 and rod 42 and throw the plate-holder into a vertical position, as shown in Fig. 8, so as to deliver a picture-plate into the bath-tank.

The carrier-chute 37 extends vertically through the main case 10 in the rear of the lens 16, and it is open at the back, so that the rack on the carrier 45 may be exposed. The carrier 45 is adapted to hold a series of ordinary sensitive picture-plates, and it is made to fit and slide within the chute 37. The carrier is provided with a forwardly-inclined top and bottom, and with a series of inclined slideways or shelves 46 in its sides, which slideways support the picture-plates, and they will naturally slide forward out of the carrier; but the carrier is provided with vertically-aligning holes 47 in the top and bottom, and near the front side, and through these holes a rod 48 is passed, which prevents the plates from sliding from the carrier.

When the carrier is inserted in the chute 37, the rod 48 is withdrawn and the plates will press against the front wall of the chute, and when a plate comes opposite the slot 37ª in the front of the chute it will slide through the slot and into the plate-holder 43, which is ready to receive it, as shown in Fig. 3.

The carrier 45 is provided on its back side with a rack 49, which rack has on opposite sides teeth 49ª, which alternate, and the rack is operated by a two-armed spider 50, which is mounted on a vertical rock-shaft 51, which is arranged behind the chute 37. The arms 52 of the spider 50 are adapted to enter between the teeth 49ª of the rack 49, and as the shaft 51 is rocked the arms 52 will alternately engage teeth on opposite sides of the rack 49, and at every movement will allow the carrier 45 to drop half the distance of one of the teeth 49ª, thus bringing a new plate into position to slide into the plate-holder 43 at every movement of the carrier.

The rock-shaft 51 is provided near its lower end with a crank 53, which crank is pivoted to a rod 54, that moves in a slideway 54ª, and the rear end of the rod is formed into an eccentric-strap which engages an eccentric 55 on the main shaft 21, the eccentric and eccentric-strap being of the common construction, and it will thus be seen that at each revolution of the main shaft the rod 54 will rock the shaft 51 and will deliver a plate into the plate-holder, as already described.

The bath-tank 44 is provided with two chambers 56 and 57, which are arranged one above the other, and which chambers are closed at the bottom by transverse plugs or valves 58 and 59, which plugs or valves have longitudinal slots 60 extending through them, and the slots are wide enough so that when they align with the two chambers a plate may be dropped through them. The plugs or valves 58 59 extend outward through the side of the tank 44, and each is provided at its outer end with a pinion 61, which meshes with a vertically-movable rack 62, which is held to slide in keepers 63, secured to one side of the tank 44, and the upper end of the rack is bent outward, as shown at 64 in Fig. 3, and is provided with a truck, which when the rack is moved upward contacts with a crank 65 on one end of a shaft 65ª, which shaft is mounted near the upper end of the tank 44 and is provided with a depending crank 66, which enters a recess in the slide 67, and this slide extends forward through the top of the tank 44 and beneath the plate-holder 43, being normally held forward by a spring 67ª, so as to prevent the picture-plate from sliding from the plate-holder until the proper time; but when the rack moves upward it tilts the rock-shaft 65ª, so as to pull the slide 67 out from the top of the tank 44 and allow the plate to drop.

The rack 62 is moved by the following mechanism: It is provided near the lower end and on the back side with a projecting ledge 68, which is adapted to be operated by a lever 69, and the lever is centrally pivoted in a support 70 and has its rear end turned up, as shown at 71, so as to engage the face of the cam 4, which is fixed to the main driving-shaft 21. The forward end of the lever 69 is provided with a truck, which strikes the ledge 68 of the rack 62, and it will be seen that when the rear end of the lever is depressed the forward end will be raised, thus lifting the rack. The rack is pulled downward by a spring 72, secured to its lower end and to a suitable support 73. The rack 62 operates both of the pinions 61 and both of the plugs or valves 58 and 59, and the plugs are arranged so that when the upper one is opened the lower one will be closed.

The cam 4 is provided with an indentation 4ª, which terminates in a deeper indentation 4ᵇ, and after the cam has been turned to raise the rack, as shown in Fig. 12, the lever 69, as the cam revolves, will drop into the first indentation 4ª and turn the upper valve or plug 58, so as to allow the picture-plate to drop through it, and when the cam moves still farther the lever will drop into the indentation 4ᵇ, thus opening the lower valve and allowing the picture-plate to drop through it, and the continued movement of the cam again tilts the lever and raises the rack into its normal position. The picture will have been completed after it drops from the lower chamber 57, and the lower portion of the tank 44 is formed into a chute 44ᶜ, which extends through the front of the case 10 and terminates in a tray 44ᵈ, on which the picture is delivered.

The cam 2 on the main shaft is intended to operate and raise the lens-shutter at the same time the plate-holder 43 is thrown into a vertical position, so that the focus will pass through the opening 44$^b$ in the upper part of the plate 44$^a$, and the picture will be produced upon the plate which is held in the holder 43.

The means for operating the shutter is as follows: A lever 74 is pivoted on the back side of the chute 37, and its rear end extends into the path of the cam 2 and is bent upward, as shown at 74$^a$ in Fig. 9, so as to engage the cam projection 2$^a$. A vertical rod 75 is secured to the lever near its inner end and extends upward therefrom to connect with a lever 76, which is pivoted on the chute 37 and is bent to extend around in front of the chute. The forward end of this lever is connected by a rod 77 with another lever 78, which at its rear end is pivoted to the front of the chute 37 and which at its forward end is connected with a shutter 79, which closes the lens 16 of the machine. It will thus be seen that when the cam 2 is revolved the projection 2$^a$, striking the bent end of the lever 74, will depress the lever, thus raising the forward end of the lever 76 and lifting the lever 78, so as to raise the shutter 79, and the length of time which the shutter is raised and the lens exposed will depend upon the size of the cam projection 2$^a$.

The upper chamber 56 of the tank 44 is used as a developing-chamber and the lower chamber 57 as a fixing-chamber, and to supply the chambers with the necessary liquid the following mechanism is used: The cam 3 on the main driving-shaft is provided with a projection 3$^a$ on one side, and in the rear of this cam is pivoted a lever 80, which has its free end bent to extend into the path of the cam, and the lever is provided with a rod 81, which extends upward to a point adjacent to the top of the case 10 and is pivoted at its upper end to one arm of a bell-crank 82, which crank is pivoted at its elbow on a lug 83, projecting from the inner wall of the main case, and the other arm of the bell-crank is connected to a common weight-valve 82$^a$, which is placed at the end of a pipe 84, which enters the top of the tank 85$^a$, which contains the fixing-liquid. It will thus be seen that when the bell-crank is tilted to raise the valve air will be admitted to the tank, so that the liquid will flow easily from it. The rod 81, which is connected to the bell-crank 82, is also connected near the bottom of the tank to a vertically-swinging bell-crank 86, and this crank is connected by a link 86$^a$ to a rod 87, which rod is pivoted to the ends of the cranks 88 of the valve-stems 89, and these valve-stems extend downward into the valves 90. Each of these valves 90 is provided with a two-way opening 91, and one of the valves is connected by a pipe 92 with the tank 85, containing the developing-liquid, and the other valve is connected by a pipe 92$^a$ with the tank 85$^a$, containing the fixing-liquid. The valves are also connected by pipes 96 and 97 with the developing and fixing chambers, respectively, of the bath-tank 44, and the valves are normally held by a spring 87$^a$, which is secured to the rod 87, so that the two-way opening will align with the pipes leading to the developing and fixing chambers and with the pipes 94 of the bulbs 93, there being one of these bulbs adjacent to each of the valves 90, and the bulbs 93 are provided with vent-pipes 95, which extend upward therefrom. These bulbs 93 are adapted to hold a proper charge for the chambers in the bath-tank, and when the cam 3 is turned so that the projection 3$^a$ strikes the bent end of the lever 80 the valve-stems 89 will be turned so that the openings 91 will align with the supply-pipes 92 and 92$^a$ and with the pipes 94, thus admitting a charge to the bulbs 93, and when the projection 3$^a$ passes the lever 80 it will drop back to its normal position and the valve-stems will be turned so that the charge will run from the bulbs into the pipes 96 and 97 and be conveyed into the developing and fixing chambers of the bath-tank.

The following means are employed to discharge the liquids from the chambers 56 and 57 after the pictures have been taken: A cam 5 is arranged on the main driving-shaft 21 and is provided with a projection 5$^a$, and in the rear of this cam is pivoted a vertical post 98, which has a projecting arm 99 extending into the path of the projection 5$^a$ of the cam, and the upper end of the post is connected by a rod 100 with the bell-crank 101, which is pivoted on a suitable support near the front of the case, and the other arm of this bell-crank is connected by a rod 102 with a valve 103 in the pipe 104, which pipe extends from the chamber 56 of the bath-tank, as best shown in Fig. 4, and the pipe 104 may be led to any convenient place where the liquid will run to waste, as it cannot be used again. A cam 6, which is similar to the cam 5, is fixed to the shaft 21, adjacent to the cam 5, and in the rear of this cam is pivoted a vertical post 105, which has a projecting arm 106, extending into the path of a projection 6$^a$ on the face of the cam, and the lower end of this post is connected by a rod 107 with the bell-crank 108, which is pivoted adjacent to the crank 101 and a little below it, and the opposite arm of the bell-crank 108 is connected by a rod 109 with the valve-stem of a valve 110, which valve is placed in the pipe 111, opening from the fixing-chamber 57, and this pipe leads to a tank 112, so that the fixing-liquid will be saved, as it may be used several times over. It will be seen that when the cams 5 and 6 are revolved they will tilt the posts 98 and 105, and by means of the connecting mechanism will operate the valves in the pipes 104 and 111, so that after the picture has been developed and fixed the liquids will be discharged from the developing and fixing chambers.

Near one end of the shaft 21 is a bevel gear-wheel 113, which is geared to a shaft 114, and this shaft extends horizontally forward through the front of the case 10 and is provided at its outer end with a hand 115, which turns in a glass case 116, secured to the main case 10, and the hand will thus indicate when the shaft 21 has made a complete revolution, and the person whose picture is being taken may thus note the progress of the work. The shaft 21 is also provided with a cam 7, similar to the cams 5 and 6, already described, and this cam operates a rod 117 by means of a connecting-post like the posts 98 and 105, and the rear end of this rod is connected to a crank 118, which is secured to a vertical shaft 119, and this shaft is adapted to operate the electric light mechanism, which mechanism will be fully described in another application, which I have filed simultaneously herewith.

The machine is also provided with a music roll or box 120, which is run by a gear-wheel 121, that meshes with a similar gear-wheel 122 of a train of gearing arranged near and operated from one end of the main shaft 21, and while the machine is working the music-box will be operated so as to take up the attention of the person whose picture is being taken.

In Fig. 27 I have shown a modified means of raising and lowering the main case 10, and in this instance the case 10 is provided with a boss 123 on the bottom, which rests in a corresponding socket 124 on the upper end of a screw 125, and this screw is mounted in the top of the lower case 13, which thus forms a base for the machine, and the screw is turned by means of a handle 126, so as to bring the case into a desired position. Instead of using the screw, however, the case may be raised and lowered by a rack-and-pinion mechanism, or other means may be employed, as I do not confine myself to any particular means of adjusting it.

The operation of the machine is as follows: The person whose picture is to be taken moves the case 10 until his eyes appear in the mirror 18, and he then drops a coin in the slot 31, and the coin passes down upon the coin-plate and releases the clock-work mechanism in the manner described, so that the shaft 21 begins to revolve. As soon as the shaft starts the cam 1 operates the plate-holder 43 by means of the mechanism described, so as to swing it into a vertical position, as shown in Fig. 8, thus bringing the plate contained by the holder immediately behind the opening 44$^b$ in the plate 44$^a$, which opening aligns with the lens 16, and the cam 2, by means of the lever mechanism described, raises the shutter 79, so as to expose the plate. As soon as the lever 74, as shown in Fig. 9, drops from the projection on the cam 2 the shutter 79 will be closed, and the cam 3 will operate the valves 90, so as to deliver the developing and fixing liquids into the chambers 56 and 57 of the bath-tank, and the rack 62 will be raised by the cam 4, so as to move the slide 67 and allow the plate to drop from the holder 43 into the developing-chamber 56, as shown in Fig. 12. When the plate has remained in the chamber 56 long enough to be developed, the cam 5 and the mechanism connected therewith will open the valve 103, so as to allow the liquid to run from the developing-chamber 56, and the cam 4 will have advanced so that the bent end of the lever 69 will drop into the indentation 4$^a$ of the cam 4, thus opening the upper valve or plug 58 in the bath-tank and the picture-plate will drop through into the fixing-chamber 57, and when it has been there sufficiently long for the picture to be fixed the cam 4 will again move the rack and turn the lower plug or valve 59, so as to allow the completed picture to drop through the chute 44$^c$ and be delivered upon the tray 44$^d$. At the same time the valve 110 will be turned in the manner described and the fixing-liquid will flow through the pipe 111 to the valve 112, and if it is night the electric-light mechanism will be adjusted, so that the cam 7 will operate the flash-light at the same time that the shutter 79 is raised, so that a picture may be taken at night as well as in the day time, and in order that the lights may not be too bright, so as to disconcert the person posing, they are covered with colored glass, which will give them a soft appearance and render them easy to the eyes.

Having thus described my invention, I claim as new and desire to secure by Letters Patent—

1. A photograph-machine having a vertically-adjustable case to carry the lens with a mirror secured to the case adjacent to the lens, substantially as described.

2. A photograph-machine comprising a main case having a lens therein, a shutter for the lens, developing and fixing chambers behind and below the lens, a swinging plate-holder pivoted behind the lens and above the chambers, slotted valves at the bottom of the chambers, and coin-operated mechanism for moving the shutter, plate-holder, and valves, substantially as described.

3. In a photograph-machine of the character described, a coin-chute having a lateral bend, and a branch chute opening from the bend and having a transverse partition extending across its upper surface above the entrance to the branch chute, substantially as described.

4. In a photograph-machine of the character described, the combination, with the swinging plate-holder, of a vertical chute arranged behind the plate-holder and having a slot in its face, and a vertically-movable plate-carrier held to slide in the chute and provided with a series of inclined shelves, substantially as described.

5. In a coin-operated photograph-machine, the combination, with the swinging plate-holder, the vertical chute in the rear of the plate-holder, and the vertically-moving plate-carrier within the chute, of a rack secured to the carrier and provided on opposite sides with alternating teeth, a rock-shaft having arms to engage the rack-teeth, and coin-operated means for moving the shaft, substantially as described.

6. In a coin-operated photograph-machine having a coin-controlled driving-shaft with cams thereon, the combination, with the swinging plate-holder, of a pivoted lever extending into the path of a cam, a rod connecting the lever with a spring-pressed link, and a rod connecting the link with the plate-holder, substantially as described.

7. In a coin-operated photograph-machine having a coin-controlled driving-shaft, the combination, with the vertically-movable plate-carrier having a rack thereon with alternating teeth, of a vertical rock-shaft adjacent to the rack and provided with arms to engage the rack-teeth, and means, as an eccentric-strap and rod, for moving the rack-shaft from the main shaft, substantially as described.

8. In a photograph-machine, the combination, with a coin-controlled shaft provided with a cam and the lens provided with a vertically-sliding shutter, of the vertically-swinging lever 78, pivoted at its inner end and connected at its outer end to said shutter, the lever 76, pivoted between its ends and connected at one end to the lever 78, and the lower lever 74, pivoted at one end, extending at its opposite end into the path of said cam and connected between its ends with the short arm of lever 76, substantially as set forth.

9. In a photograph-machine of the character described, a bath-tank having vertically-aligning developing and fixing chambers, slotted plugs or valves at the bottom of the chambers, and coin-controlled mechanism for turning the plugs or valves, substantially as described.

10. In a photograph-machine, the combination, with the swinging plate-holder arranged in the focus of the lens and a bath-tank beneath the plate-holder, said bath-tank having vertically-aligning developing and fixing chambers, of a slide to close the bottom of the plate-holder, revoluble slotted plugs or valves at the bottom of the developing and fixing chambers, and coin-operated mechanism for removing the slide and turning the plugs or valves, substantially as described.

11. In a photograph-machine, the combination, with the swinging plate-holder having a slide at the bottom, and a bath-tank arranged beneath the plate-holder and having vertically-aligning developing and fixing chambers, of revoluble slotted plugs or valves in the bottom of the chambers, said plugs or valves having pinions at their outer ends, a vertically-movable rack, which meshes with the pinions and a rock-shaft having at one end a crank connecting with the plate-holder slide, and at the opposite end a crank, which extends into the path of the rack, substantially as described.

12. In a coin-operated photograph-machine, the combination, with the plate-holder having a removable slide at its lower end, and a bath-tank arranged beneath the plate-holder and provided with developing and fixing chambers, of slotted valves or plugs arranged in the bottom of the chambers, and means for alternately operating the plugs or valves, substantially as described.

13. In a photograph-machine of the character described, a bath-tank having developing and fixing chambers at its upper end and having its lower end formed into a delivery-chute, which terminates in a tray, substantially as described.

14. In a photograph-machine having a coin-controlled driving-shaft, the combination, with the developing and fixing chambers, of tanks arranged above the chambers, pipes leading from the tanks to the chambers and provided with valves, and a lever mechanism for moving the valves, said mechanism being operated by a cam on the driving-shaft, substantially as described.

15. In a photograph-machine of the character described, the combination, with the developing and fixing chambers, and tanks containing the developing and fixing liquid, of two-way valves having pipes leading to the chambers and to the tanks, and measuring-bulbs arranged adjacent to the valves and connected therewith, substantially as described.

16. In a photograph-machine having a coin-controlled driving-shaft therein, the combination, with the developing and fixing chambers, and the tanks carrying developing and fixing liquid, of pipes leading from the tanks to the chambers, valves located in the pipes, a weight-valve arranged in the top of the fixing-liquid tank, and a cam-operated lever mechanism for operating all the valves simultaneously, substantially as described.

17. In a photograph-machine having a coin-controlled driving-shaft, the combination, with the developing and fixing chambers having valve-controlled waste-pipes opening therefrom, of a lever mechanism connected with the valves and operated by cams on the driving-shaft, substantially as described.

PIERRE V. W. WELSH.

Witnesses:
WARREN B. HUTCHINSON,
E. M. CLARK.